United States Patent [19]

Agano et al.

[11] Patent Number: 5,017,774

[45] Date of Patent: May 21, 1991

[54] RADIATION IMAGE READ-OUT AND REPRODUCING METHOD

[75] Inventors: Toshitaka Agano; Yuichi Fuseda, both of Kanagawa, Japan

[73] Assignee: Fuji Photo Film Co., Ltd., Kanagawa, Japan

[21] Appl. No.: 422,465

[22] Filed: Oct. 17, 1989

[30] Foreign Application Priority Data

Oct. 17, 1988 [JP] Japan ............................... 63-261173

[51] Int. Cl.$^5$ ............................................ G01N 23/04
[52] U.S. Cl. ............................. 250/327.2; 256/484.1
[58] Field of Search ................ 250/327.2 G, 327.2 F, 250/484.1 B, 327.2 D; 364/413.13

[56] References Cited

U.S. PATENT DOCUMENTS

| | | |
|---|---|---|
| 4,258,264 | 3/1981 | Kotera et al. |
| 4,276,473 | 6/1981 | Kato et al. |
| 4,315,318 | 2/1982 | Kato et al. |
| 4,387,428 | 6/1983 | Ishida et al. |
| 4,395,737 | 7/1983 | Komaki et al. |
| 4,527,060 | 7/1985 | Suzuki et al. |

FOREIGN PATENT DOCUMENTS 56-11395 1/1981 Japan .

Primary Examiner—Jack I. Berman
Assistant Examiner—Richard Hanig
Attorney, Agent, or Firm—Sughrue, Mion, Zinn, Macpeak & Seas

[57] ABSTRACT

A read-out operation is carried out in which a stimulable phosphor sheet having a radiation image stored thereon is exposed to stimulating rays, which cause it to emit light in proportion to the amount of energy stored thereon during its exposure to radiation, the emitted light is photoelectrically detected and read-out image signal is thereby obtained. A reproducing operation is then carried out in which the read-out image signal is used to reproduce a visible radiation image. A radiation image read-out and reproducing method comprises the steps of carrying out processing which obtains information from the read-out image signal, said information being used to determine the conditions under which image processing is to be conducted, and at least one type of image processing, which can be conducted without the information being used, during the period of time from when the read-out operation is being carried out to when the reproducing operation is begun. After the reproducing operation is begun, image processing, wherein the optimum image processing conditions are determined on the basis of the information, is carried out.

4 Claims, 2 Drawing Sheets

RADIATION IMAGE READ-OUT AND REPRODUCING METHOD

BACKGROUND OF THE INVENTION

1. Field of the Invention

This invention relates to a radiation image read-out and reproducing method wherein a stimulable phosphor sheet having a radiation image stored thereon is exposed to stimulating rays which cause the stimulable phosphor sheet to emit light in proportion to the amount of energy stored thereon during exposure to radiation, the emitted light is photoelectrically detected and an electric image signal is thereby obtained, which electric image signal represents the radiation image and is used to reproduce a visible image on a recording sheet.

2. Description of the Prior Art

When certain kinds of phosphors are exposed to radiation such as X-rays, α-rays, β-rays, γ-rays, cathode rays, or ultraviolet rays, they store part of the energy of the radiation. Then, when the phosphor, which has been exposed to the radiation, is exposed to stimulating rays such as visible light, light is emitted by the phosphor in proportion to the amount of energy stored thereon during exposure to the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation, which has passed through an object such as a human body, in order to store a radiation image of the object thereon, and is then scanned with stimulating rays, such as a laser beam, which cause it to emit light in proportion to the amount of energy stored thereon during its exposure to the radiation. The light emitted by the stimulable phosphor sheet upon stimulation thereof is photoelectrically detected and converted into an electric image signal, and the image signal is used to reproduce the radiation image of the object as a visible image on a recording material such as photographic film, on a display device such as a cathode ray tube (CRT), or the like.

In the aforesaid radiation image recording and reproducing systems, in order to eliminate various problems caused by variations in the input information and/or to obtain a radiation image which has good image quality and can serve as an effective tool in, for example, the efficient and accurate diagnosis of an illness, it is desirable to ascertain the characteristics of the image input information before the radiation image is reproduced as a visible image so that the read-out gain can be adjusted to an appropriate value. The characteristics of the image input information depend on the conditions under which an image is recorded, such as the level of the radiation dose used when the image is recorded, on the image input pattern which is determined by what portion of an object (e.g. the chest or the abdomen of a human body) is recorded, and on the image recording method used, such as plain image recording or contrasted image recording. Determining the characteristics of the image input information will hereinafter simply be referred to as "ascertaining the image input information." It is also desirable to adjust the scale factor in accordance with the contrast in the image input pattern in order to optimize the resolution of the reproduced visible image. Also, in cases where image processing, such as gradation processing, is carried out on the read-out image signal, it is desirable to adjust the conditions under which an image is processed in accordance with the characteristics of the image input information.

The method as disclosed in U.S. Pat. No. 4,527,060 may be used to ascertain the image input information before the visible image is reproduced. In the disclosed method, a preliminary read-out operation (hereinafter referred to as the "preliminary readout") is carried out to ascertain the image input information of a radiation image stored on a stimulable phosphor sheet. During the preliminary readout, stimulating rays are used which have an energy level lower than the energy level of the stimulating rays used in a final read-out operation (hereinafter referred to as the "final readout"), which results in a visible image which can be used, particularly for diagnostic purposes. After the preliminary readout is completed, the final readout is carried out.

However, in cases where a preliminary readout is carried out, the processing required to complete the readout takes a long time. Therefore, recently, a novel radiation image processing method has been proposed, which enables a visible radiation image having good image quality to be reproduced, and which, in particular, makes the visible image effective as a tool in the accurate and efficient diagnosis of an illness, without a preliminary readout being carried out. With the proposed radiation image processing method, the emitted light detection range is adjusted so that it is relatively wide during the read-out operation, which results in a visible image which can be used for diagnostic purposes. The optimum value of the read-out gain is calculated from a read-out image signal obtained from the read-out operation, and the read-out image signal is transformed on the basis of the optimum read-out gain into the image signal which would have been obtained if the optimum read-out gain had been used in the read-out operation. By way of example, the optimum read-out gain is set so that the mean value Sk of the read-out image signal range Smin to Smax, which read-out image signal is used to reproduce a visible image, corresponds to the mean value of a predetermined image signal range Qmin to Qmax, which is fed into an image reproducing apparatus. The optimum read-out gain is calculated as a function of the characteristic value (mean value) Sk of the read-out image signal range Smin to Smax. For example, in cases where the probability density function of the read-out image signal is indicated by Curve A in FIG. 3, the mean value of the read-out image signal range Smin to Smax is equal to Sk, and the read-out image signal range Smin to Smax should be transformed into an image signal range Qmin to Qmax with a scale factor Gp (which is the slope of the transformation straight line H in FIG. 3), the image signal components falling in the read-out image signal range Smin to Smax may be transformed so that the value Sk becomes equal to a value Sk', i.e. so that the probability density function of the resulting image signal is indicated by Curve A' in FIG. 3.

The scale factor Gp determines the latitude of a reproduced visible image. In cases where a preliminary readout is carried out, the scale factor Gp has heretofore been adjusted on the basis of image input information ascertained from an image signal obtained from the preliminary readout. During the final readout, the read-out image signal has heretofore been transformed in accordance with the scale factor Gp. However, in cases where transformation processing is carried out to correct the read-out gain as described above, transformation processing can be and often is simultaneously carried out to determine the latitude. Basically, the characteristic value Gp, which is used in the transformation processing carried out to determine the latitude, and the characteristic value Sk, which is used in the transformation processing carried out to correct the read-out gain, can be calculated when the minimum value Smax and the maximum value Smin of the image signal range are known. Therefore, in order to calculate the characteristic values Sk and Gp, the minimum value Smax and the maximum value Smin may be found through, for example, averaging processing performed on the whole read-out image signal obtained from the read-out operation, wherein, for example, the emitted light detection range is adjusted so that it is relatively wide. After the characteristic values Sk and Gp are calculated, they are used to carry out transformation processing expressed by the formula, for example, $$Q = Gp \cdot (S - Sk) + Qcenter \qquad (1)$$

where Qcenter denotes the center value of the output image signal range (the center value Qcenter is 511 in cases where the level of the output image signal ranges from 0 to 1023). In this manner, transformation processing for the correction of the read-out gain and transformation processing for the determination of the latitude can be carried out simultaneously.

In general, in order to obtain a reproduced visible image which has better image quality and can serve as a more effective tool, in particular, in the efficient and accurate diagnosis of an illness, transformation processing based on the characteristic values Sk and Gp as well as various other types of processing are carried out; for example, gradation processing, frequency emphasis processing, enlargement/reduction processing, and RI (Radio Isope) removal processing (which is carried out to remove those noise components from a read-out image signal, that are generated by environmental radiation, or the like, and cause black dots to arise in a reproduced visible image) may be carried out.

Heretofore, after the read-out operation is finished and the characteristic values Sk and Gp are calculated, the various types of image processing described above are carried out nearly simultaneously with the reproduction of the visible image (specifically, slightly before the visible image is reproduced).

However, when many types of image processing are carried out during the reproduction of a visible image, a long time is required until the image processing is completed. As a result, the speed with which a visible image can be reproduced becomes low, and reproducing a visible image takes a long time.

SUMMARY OF THE INVENTION

The primary object of the present invention is to provide a radiation image read-out and reproducing method wherein image processing can be carried out quickly as a visible radiation image is reproduced.

Another object of the present invention is to provide a radiation image read-out and reproducing method which enables a visible radiation image having good image quality to be reproduced quickly, and which, in particular, makes the visible radiation image effective as a tool in the accurate and efficient diagnosis of an illness.

The present invention is based on findings showing that image processing, such as RI removal processing, unsharp mask processing and enlargement/reduction processing, can be carried out even though the characteristic values Sk and Gp have not been calculated.

The present invention provides a radiation image read-out and reproducing method wherein a read-out operation is carried out in which a stimulable phosphor sheet having a radiation image stored thereon is exposed to stimulating rays, which cause the stimulable phosphor sheet to emit light in proportion to the amount of energy stored thereon during exposure to radiation, and wherein the emitted light is photoelectrically detected and a read-out image signal is thereby obtained, said read-out image signal representing the radiation image and being used in a reproducing operation, in which the radiation image is reproduced as a visible image, the radiation image read-out and reproducing method comprising the steps of:

(i) carrying out processing which obtains information from said read-out image signal, said information being used to determine the conditions under which image processing is to be conducted, and carrying out at least one other type of image processing which can be conducted without said information being used, said processing which obtains information and said at least one other type of processing being carried out during the period of time from when said read-out operation is being carried out to when said reproducing operation is begun, and (ii) carrying out image processing, wherein the optimum image processing conditions are determined on the basis of said information after said reproducing operation is begun.

With the radiation image read-out and reproducing method in accordance with the present invention, processing, which obtains information to be used to determine the conditions under which image processing is to be conducted, is carried out during the period of time from when the read-out operation is being carried out to when the reproducing operation is begun. The information is obtained from the read-out image signal, and image processing, wherein the optimum image processing conditions are determined on the basis of said information, is carried out after the reproducing operation is begun. Also, at least one other type of image processing, which can be conducted without said information being used, is carried out during the period of time from when the read-out operation is being carried out to when the reproducing operation is begun. In this manner, several types of image processing, which are ordinarily carried out in the process of obtaining a visible radiation image which has good image quality and can serve as an effective tool in, for example, the accurate and efficient diagnosis of an illness, are carried out during different periods. Therefore, the time required to complete the reproducing operation is not prolonged due to the image processing, and a visible radiation image can be reproduced quickly.

In the present invention, processing carried out to calculate the characteristic value Sk and Gp and at least one type of image processing selected from the group consisting of RI removal processing, unsharp mask processing, enlargement/reduction processing, and the like are carried out during the period of time from when the read-out operation is being carried out to when the reproducing operation is begun. Processing based on the characteristic values Sk and Gp, such as Sk transformation processing, Gp transformation processing, frequency emphasis processing, and gradation processing, are carried out after the reproducing operation is begun.

DESCRIPTION OF THE PREFERRED EMBODIMENTS

The present invention will hereinbelow be described in further detail with reference to the accompanying drawings.

Figure 1:
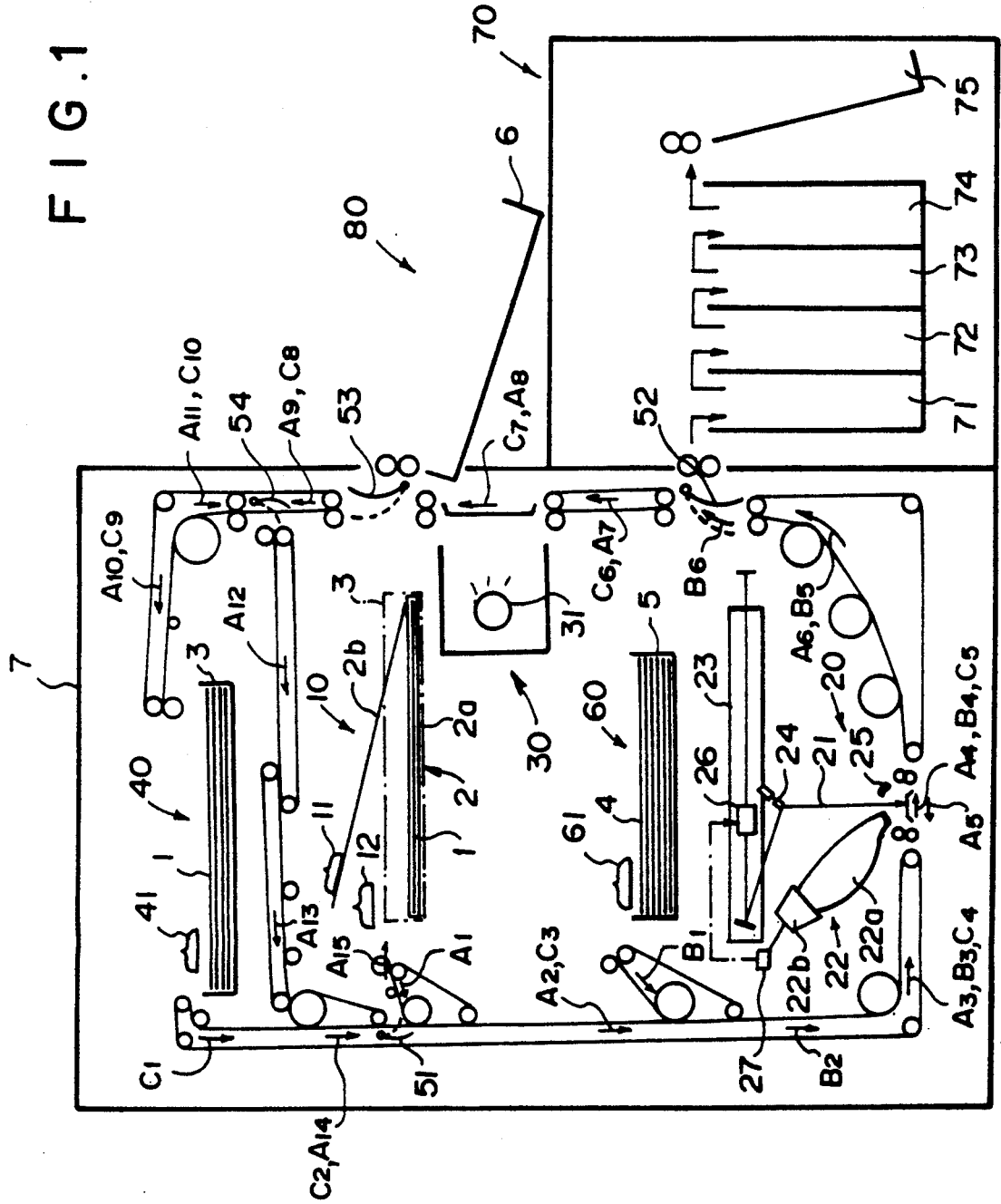
FIG. 1 is a schematic side view showing an example of a radiation image read-out and reproducing apparatus wherein an embodiment of the radiation image read-out and reproducing method in accordance with the present invention is employed.

FIG. 1 shows an example of a radiation image read-out and reproducing apparatus wherein a radiation image is read out from a stimulable phosphor sheet and a read-out image signal is thereby obtained. The read-out image signal is used to reproduce the radiation image as a visible image in accordance with an embodiment of the radiation image read-out and reproducing method of the present invention. By way of example, in the radiation image read-out and reproducing apparatus, readout and reproduction of the radiation image are carried out in a single stage.

With reference to FIG. 1, the radiation image read-out and reproducing apparatus is provided with a cassette holding section 10, which releasably holds a cassette 2 capable of housing a stimulable phosphor sheet 1 therein, and a magazine holding section 40, which releasably holds a stimulable phosphor sheet magazine 3 capable of housing a plurality of stimulable phosphor sheets 1, 1, . . . therein. The radiation image read-out and reproducing apparatus is also provided with a recording sheet feeding section 60, which releasably holds a recording sheet feeding magazine 5 capable of housing a plurality of recording sheets 4, 4, . . . therein, a light beam scanning section 20, in which a radiation image stored on a stimulable phosphor sheet 1 is read out and reproduced on a recording sheet 4, and an erasing section 30, in which any energy remaining on the stimulable phosphor sheet 1 after the radiation image has been read out therefrom in the light beam scanning section 20 is erased. The radiation image read-out and reproducing apparatus is further provided with an automatic developing section 70, which carries out development of the recording sheet 4 on which the radiation image has been reproduced in the light beam scanning section 20, and a tray holding section 80, which releasably holds a tray 6 capable of housing a plurality of the stimulable phosphor sheets 1, 1, . . . therein. Also, the radiation image read-out and reproducing apparatus is provided with a first stimulable phosphor sheet conveyance means for receiving a stimulable phosphor sheet 1 fed out of the cassette holding section 10, conveying the stimulable phosphor sheet 1 to the light beam scanning section 20 and the erasing section 30 in this order and then conveying the stimulable phosphor sheet 1 to the cassette holding section 10, and a second stimulable phosphor sheet conveyance means for receiving a stimulable phosphor sheet 1 fed out of the magazine holding section 40 and conveying the stimulable phosphor sheet 1 to the light beam scanning section 20, the erasing section 30 and the tray holding section 80 in this order. Furthermore, a recording sheet conveyance means receives a recording sheet 4 fed out of the recording sheet feeding section 60 and conveys it to the light beam scanning section 20 and the automatic developing section 70 in this order. Most parts of these three conveyance means are common to one another, and the three conveyance means are generically referred to as a sheet conveyance means 50.

The stimulable phosphor sheet 1 is housed in the cassette 2 and is subjected to image recording in an external image recording apparatus (not shown) in that form. The cassette 2, in which the stimulable phosphor sheet 1 having a radiation image stored thereon is housed, is then fed to the cassette holding section 10. The cassette 2 is sealed against light, which prevents the stimulable phosphor sheet 1 from being exposed to external light when it is housed therein. The cassette 2 comprises a cassette body 2a in which the stimulable phosphor sheet 1 is to be housed and a cover member 2b which can be opened. When the cassette 2 is fed into the cassette holding section 10, the cover member 2b is kept in the closed position. When the stimulable phosphor sheet 1 is to be taken out of the cassette 2 in the cassette holding section 10, a cover opening means 11, which may be constituted of an air suction cup or the like, opens the cover member 2b as illustrated. After the cover member 2b is opened, a stimulable phosphor sheet take-out means 12, which may be constituted of an air suction cup or the like, advances into the cassette 2, sucks the stimulable phosphor sheet 1 out of the cassette 2, and feeds it to the part of the sheet conveyance means 50 which is close to the cassette holding section 10. The stimulable phosphor sheet 1 is held in the cassette 2 with its front surface, which is provided with the stimulable phosphor layer, facing down.

The stimulable phosphor sheet 1, which has been taken out of the cassette 2 in this manner, is conveyed by the sheet conveyance means 50 in the direction indicated by the arrow A1. A distribution means 51, which can move between the position indicated by the solid line and the position indicated by the broken line in FIG. 1, is provided in the sheet conveyance means 50. When the stimulable phosphor sheet 1 is fed out of the cassette 2, the distribution means 51 moves to the position indicated by the solid line in order to allow the stimulable phosphor sheet 1 to be conveyed toward the light beam scanning section 20. The stimulable phosphor sheet 1 is further conveyed in the directions indicated by the arrows A2 and A3 into the light beam scanning section 20.

In cases where the stimulable phosphor sheet 1 has thus been conveyed into the light beam scanning section 20, the light beam scanning section 20 scans the stimulable phosphor sheet 1 having a radiation image stored thereon with a laser beam 21, which acts as the stimulating rays and causes the stimulable phosphor sheet 1 to emit light in proportion to the amount of energy stored thereon during its exposure to radiation. Also, the light beam scanning section 20 photoelectrically detects the emitted light with a photoelectric read-out means 22 constituted of a photomultiplier or the like, and thereby an electric image signal, which is to be used in the reproduction of a visible image, is obtained. Reference numeral 23 denotes a laser beam source such as a He-Ne laser, and reference numeral 24 denotes a light deflector such as a galvanometer mirror. Reference numeral 25 denotes a reflection mirror which reflects the light emitted by the stimulable phosphor sheet 1 towards a light guide member 22a of the photoelectric read-out means 22. The light guide member 22a guides the light through repeated total reflection thereof until it reaches a photodetector 22b constituted of a photomultiplier or the like. Reference numeral 26 denotes a light modulator, such as an acousto-optic modulator (AOM), which is not activated when the laser beam 21 scans the stimulable phosphor sheet 1.

The stimulable phosphor sheet 1, which was sent to the light beam scanning section 20, is conveyed by the sheet conveyance means 50 in the direction indicated by the arrow A4 and is simultaneously scanned with the laser beam 21, which is deflected in a direction approximately normal to the direction of conveyance indicated by the arrow A4. As a result, the overall surface of the stimulable phosphor sheet 1 is two-dimensionally scanned with the laser beam 21, which causes the stimulable phosphor sheet 1 to emit light in proportion to the amount of energy stored thereon during its exposure to radiation. The light emitted by the stimulable phosphor sheet 1 is detected by the photodetector 22b via the light guide member 22a. The photodetector 22b converts the detected light into an electric signal (read-out image signal), which is then sent to an image information processing circuit 27, where amplification processing and image processing (which will be described later) are carried out on the electric signal.

The optical elements in the light beam scanning section 20 are not limited to those described above. For example, as disclosed in U.S. patent application Ser. No. 141,259, a long photomultiplier having an elongated light receiving face may be located in such a way that the elongated light receiving face extends along the main scanning line and detects the light emitted by the stimulable phosphor sheet 1.

In this embodiment, no preliminary readout is carried out, and therefore the light detection range of the photodetector 22b is set to be relatively wide (for example, approximately 4 orders of ten) during the read-out operation.

After the image readout from the stimulable phosphor sheet 1 is finished in the light beam scanning section 20, the stimulable phosphor sheet 1 is conveyed by the sheet conveyance means 50 in the directions indicated by the arrows A6 and A7. A distribution means 52 is disposed between the light beam scanning section 20 and the erasing section 30. When the stimulable phosphor sheet 1 is thus being conveyed, the distribution means 52 is located at the position indicated by the solid line in FIG. 1 and guides the stimulable phosphor sheet 1 to the erasing section 30.

In the erasing section 30, any energy remaining on the stimulable phosphor sheet 1 after the radiation image has been read out therefrom is erased. Specifically, part of the energy stored on the stimulable phosphor sheet 1 during the recording of an image remains stored thereon after the image has been read out therefrom. The residual energy is erased in the erasing section 30 so that the stimulable phosphor sheet 1 may be reused. In the illustrated radiation image read-out and reproducing apparatus, the erasing section 30 is provided with a plurality of erasing light sources 31, 31, ... constituted of fluorescent lamps, tungsten-filament lamps, sodium lamps, xenon lamps, iodine lamps or the like. The stimulable phosphor sheet 1 is exposed to the erasing light produced by the erasing light sources 31, 31, ... in order to cause it to release any residual energy while it is being conveyed in the direction indicated by the arrow A8. In the erasing section 30, any known erasing method may be used. For example, erasing may be accomplished by heating the stimulable phosphor sheet 1 or by exposing it to erasing light while heating it.

After the stimulable phosphor sheet 1 is erased in the erasing section 30, it is guided by distribution means 53 and 54, which were located in advance at the positions indicated by the solid lines, and is conveyed in the directions indicated by the arrows A9 and A10. Then, the stimulable phosphor sheet 1 is conveyed in the opposite direction indicated by the arrow A11. Before the stimulable phosphor sheet 1 is thus conveyed in the opposite direction, the distribution means 54 moves to the position indicated by the broken line. The stimulable phosphor sheet 1 is guided by the distribution means 54 and conveyed by the sheet conveyance means 50 in the directions indicated by the arrows A12, A13 and A14 into the cassette holding section 10. Before the stimulable phosphor sheet 1 is thus conveyed into the cassette holding section 10, the distribution means 51 moves to the position indicated by the broken line. The stimulable phosphor sheet 1 is guided by the distribution means 51 and conveyed in the direction indicated by the arrow A15 into the empty cassette 2 at the cassette holding section 10. The erased reusable stimulable phosphor sheet 1 is taken out of the apparatus while still housed in the cassette 2 and is sent to an external image recording apparatus for reuse in image recording.

On the other hand, after the stimulable phosphor sheet 1, which was taken out of the cassette 2, is conveyed out of the light beam scanning section 20, a single recording sheet 4 may be taken by a suction means 61 out of the recording sheet feeding magazine 5 in the recording sheet feeding section 60, and fed to the part of the sheet conveyance means 50 close to the recording sheet feeding section 60. The sheet conveyance means 50 receives the recording sheet 3 and conveys it in the directions indicated by the arrows B1, B2 and B3 to the light beam scanning section 20. The radiation image, which was read from the stimulable phosphor sheet 1 in the manner described above, is reproduced on the recording sheet 4 while the recording sheet 4 is being conveyed in the direction indicated by the arrow B4 in the light beam scanning section 20.

Specifically, in cases where the recording sheet 4 is thus conveyed in the light beam scanning section 20, the light modulator 26 operates in accordance with the image signal which is generated by the image information processing circuit 27, and the photodetector is turned off. (The image signal corresponds to the read-out image signal which was obtained from the aforesaid read-out operation.) The recording sheet 4 is scanned with the laser beam 21, which now acts as the recording light and is modulated by the light modulator 26 and deflected by the light deflector 24, so that the radiation image which was stored on the stimulable phosphor sheet 1 is reproduced as a photographic latent image on the recording sheet 4.

After the image has been reproduced on the recording sheet 4 in the light beam scanning section 20, the recording sheet 4 is conveyed into the automatic developing section 70 by the sheet conveyance means 50 in the directions indicated by the arrows B5 and B6. At this time, the distribution means 52 moves to the position indicated by the broken line in FIG. 1 and guides the recording sheet 4 to the automatic developing section 70. In the illustrated radiation image read-out and reproducing apparatus, the cassette holding section 10, the magazine holding section 40, the recording sheet feeding section 60, the light beam scanning section 20, the erasing section 30 and the sheet conveyance means 50 are accommodated in a single case 7. Also, the automatic developing section 70 is combined with the side of the case 7.

In the automatic developing section 70, the recording sheet 4 is developed by being sent sequentially through a developing zone 71, a fixing zone 72, a washing zone 73 and a drying zone 74, after which it is housed in the tray 75.

The illustrated radiation image read-out and reproducing apparatus is provided with the magazine holding section 40 described above, so that image readout can also be carried out for stimulable phosphor sheets 1, 1, ... which are housed in the stimulable phosphor sheet magazine 3. Specifically, the magazine holding section 40 is provided with a sheet take-out means 41, which is constituted of an air suction cup or the like, and takes the stimulable phosphor sheets 1, 1, ... one by one out of the stimulable phosphor sheet magazine 3. The stimulable phosphor sheet 1, which has been taken out of the stimulable phosphor sheet magazine 3, is fed to the part of the sheet conveyance means 50 close to the magazine holding section 40. The stimulable phosphor sheet 1 is conveyed in the direction indicated by the arrow C1, and then conveyed in the directions indicated by the arrows C2 through C7 to the light beam scanning section 20 and the erasing section 30. The stimulable phosphor sheet 1 is subjected to image readout and erasing in the same manner as a stimulable phosphor sheet 1 fed out of the cassette 2. The stimulable phosphor sheet 1 is then conveyed in the directions indicated by the arrows C8 and C9, conveyed in the opposite direction indicated by the arrow C10, guided by the distribution means 53 which has moved to the position indicated by the broken line, and conveyed into the tray 6 at the tray holding section 80.

Figure 2:
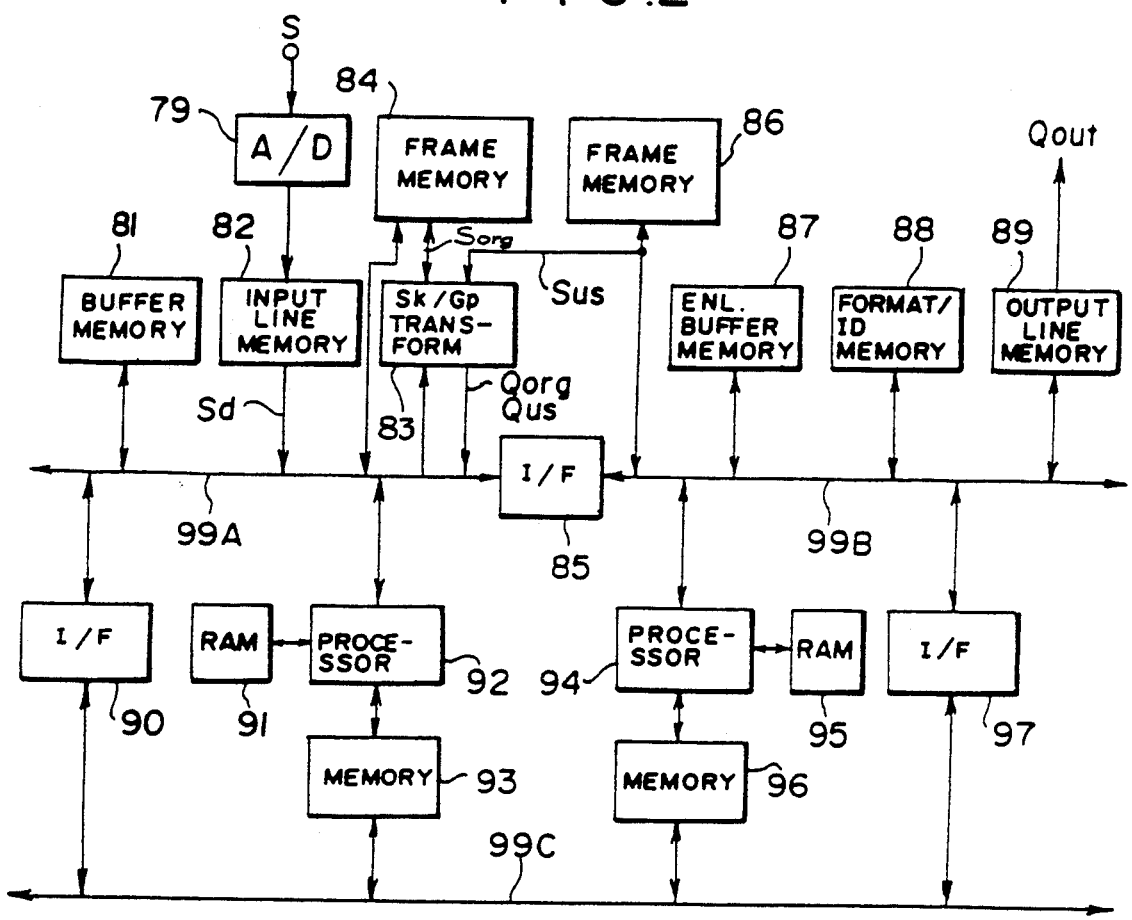
FIG. 2 is a block diagram showing an image processing circuit in the radiation image read-out and reproducing apparatus of FIG. 1.
Figure 3:
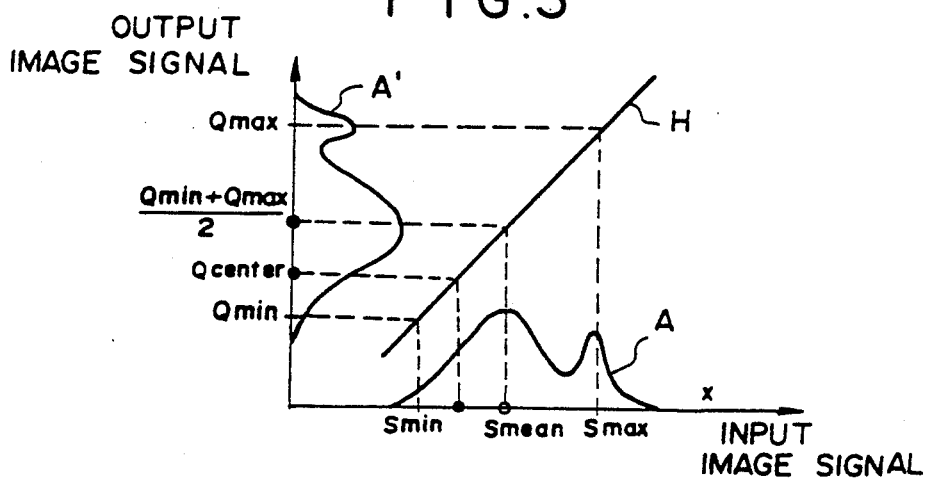
FIG. 3 is a graph which explains the transformation processing carried out to correct a readout gain and transformation processing carried out to determine latitude.

Image processing will be described hereinbelow. FIG. 2 shows an image processing circuit in the image information processing circuit 27. With reference to FIG. 2, a buffer memory 81, an input line memory 82, and an Sk/Gp transformation microprocessor 83 are connected to a bus 99A. An original signal frame memory 84 is connected to the Sk/Gp transformation microprocessor 83. The bus 99A is connected to a bus 99B via an interface 85. An unsharp mask signal frame memory 86, an enlargement buffer memory 87, a format/ID memory 88, which stores the formats of reproduced images and ID information about objects, and an output line memory 89 are connected to the bus 99B. Also, a high order MPU interface 90 and a microprocessor 92 are connected to the bus 99A. (MPU is an acronym for a microprocessor unit.) A processor memory 93, which operates the microprocessor 92, and the high order MPU interface 90 are connected to a high order MPU bus 99C. A high order MPU interface 97 and a microprocessor 94 are connected to the bus 99B. A processor memory 96, which operates the microprocessor 94, and the high order MPU interface 97 are connected to the high order MPU bus 99C. High-speed RAM's 91 and 95, which temporarily store a signal which is being processed, are respectively connected to the microprocessors 92 and 94. Microprocessor 92 is controlled by a high order MPU (not shown), which controls the radiation image read-out operation and the reproducing operation via the bus 99C and the interface 90. Also, microprocessor 94 is controlled by the high order MPU via the bus 99C and the interface 97.

When a radiation image is being read out from a stimulable phosphor sheet 1 in the light beam scanning section 20, the analog read-out image signal S obtained from the read-out operation is digitized by an A/D converter 79, and the digital read-out image signal thus obtained is fed into the input line memory 82. The input line memory 82 feeds out a digital read-out image signal Sd, representing the image information at each main scanning line. In accordance with predetermined programs which are stored in the processor memory 93, the microprocessor 92 calculates characteristic values Sk and Gp from the digital read-out image signal Sd, and carries out RI removal processing. RI removal processing is described in, for example, U.S. patent application Ser. No. 179,821 and is carried out to remove noise components from the digital read-out image signal Sd, that cause black dots to arise in a reproduced visible image. The digital read-out image signal Sd, obtained after the RI removal processing has been carried out, is temporarily stored in the buffer memory 81. Ultimately, a signal, which represents a single image and which has thus been processed, is stored as an original image signal Sorg in the original signal frame memory 84. Signals representing the characteristic values Sk and Gp, which have been calculated by the microprocessor 92, are stored in the buffer memory 81.

On the other hand, during the read-out operation, microprocessor 94 receives the digital read-out image signal Sd representing the image information at each of the main scanning lines, and carries out processing to obtain an unsharp mask signal Sus. By way of example, the unsharp mask signal Sus represents the mean value of the image signal components corresponding to picture elements located in a mask having a specific size. When the size of the mask is $N \times N$, $Sus = \Sigma S/N^2$. The unsharp mask signal Sus is stored in the unsharp mask signal frame memory 86.

The processing for calculating the characteristic values Sk and Gp, the RI removal processing, and the unsharp mask operation processing are carried out during the period of time from when the read-out operation is being carried out to when the radiation image reproducing operation is begun.

When a radiation image is reproduced in the light beam scanning section 20 in the manner described above, the Sk/Gp transformation microprocessor 83 reads the original image signal Sorg and the unsharp mask signal Sus respectively stored in the original signal frame memory 84 and the unsharp mask signal frame memory 86. Also, the Sk/Gp transformation microprocessor 83 reads the signals representing the characteristic values Sk and Gp from the buffer memory 81, and carries out the type of transformation processing expressed by Formula (1) on the original image signal Sorg and the unsharp mask signal Sus. Specifically, the original image signal Sorg is transformed to an image signal Qorg expressed as $$Qorg = Gp\,(Sorg - Sk) + Qcenter$$

where Qcenter denotes the center value of the output image signal range. (The center value Qcenter is 511 in cases where the level of the output image signal ranges from 0 to 1023.) Because transformation processing is thus carried out on the basis of the characteristic values Sk and Gp, a transformed image signal Qorg is obtained, which can be used to reproduce a visible image having a desirable image density range. The latitude is also optimized. Also, the unsharp mask signal Sus is transformed to a signal Qus expressed as $$Qus = Gp\ (Sus - Sk) + Qcenter.$$

Components of the transformed image signal Qorg and components of the transformed unsharp mask signal Qus corresponding to each of the main scanning lines, are sequentially fed out of the Sk/Gp transformation microprocessor 83. The microprocessor 92 receives the transformed image signal Qorg and the transformed unsharp mask signal Qus and carries out frequency response processing and gradation processing on the transformed image signal Qorg. Frequency response processing may be carried out in the manner disclosed in, for example, Japanese Unexamined Patent Publication No. 56(1981)-138735. Specifically, processing expressed as $$Qorg + \beta(Qorg - Qus)$$

where $\beta$ denotes a frequency emphasis coefficient is carried out in order to emphasize frequency components above a super-low frequency. Microprocessor 92 carries out frequency response processing and gradation processing with a single process. Specifically, the transformed image signal Qorg is converted into a processed image signal Qout expressed as $$Qout = \gamma\ \{Qorg + \beta\ (Qorg - Qus)\}$$

where $\gamma$ denotes a gradation correction coefficient. Gradation processing is disclosed in, for example, U.S. Pat. No. 4,394,737. Gradation processing optimizes the gradation of the reproduced visible image.

Components of the processed image signal Qout corresponding to each of the main scanning lines are temporarily stored in the output line memory 89 and fed out of the image information processing circuit 27. The processed image signal Qout controls the light modulator 26 in the light beam scanning section 20. The light modulator 26 modulates the laser beam 21 in accordance with the processed image signal Qout, and the recording sheet 4 is scanned with the modulated laser beam 21. In this manner, the radiation image, which the processed image signal Qout represents, is reproduced on the recording sheet 4.

When necessary, before the processed image signal Qout is fed to the output line memory 89, it is subjected to enlargement processing in the microprocessor 94. Enlargement processing is carried out in order to, for example, interpolate values in the processed image signal Qout while it is temporarily stored in the buffer memory 87, thereby to "thicken" the processed image signal Qout. The image signal, which is obtained after enlargement processing has been carried out, is used to reproduce an enlarged visible image Conversely, the processed image signal Qout may be "thinned" in order to reproduce a reduced visible image.

In the embodiment described above, the following three types of processing are carried out during the period of time from when a radiation image is being read out to when the reproducing operation is begun:

(1) processing to calculate the characteristic values Sk and Gp,
(2) RI removal processing and
(3) unsharp mask operation processing.

Also, the following four types of processing are carried out after the reproducing operation is begun:

(4) transformation processing in which the exact nature of the transformation is based on the characteristic values Sk and Gp,
(5) frequency emphasis processing,
(6) gradation processing, and
(7) enlargement/reduction processing.

However, these types of processing may be grouped in any other manner. In the radiation image read-out and reproducing method of the present invention, it is only necessary that the number (1) type of processing (listed above) be carried out during the period of time from when a radiation image is being read out to when the reproducing operation is begun, the number (4) type of processing (listed above), which can be conducted only after the characteristic values Sk and Gp are calculated, be carried out after the reproducing operation is begun, and at least one of the other types of processing be carried out during the period of time from when a radiation image is being read out to when the reproducing operation is begun. In the table below, I, II and III are three examples showing the different types of processing steps that can be conducted in sequence. (1), (2), . . . (7) are explained in the list discussed previously.

| | Types of processing which are carried out during the period of time from when a radiation image is being read out to when the reproducing operation is begun | Types of processing which are carried out after the reproducing operation is begun |
| --- | --- | --- |
| I | (1), (2) | (3), (4), (5), (6), (7) |
| II | (1), (2), (7) | (3), (4), (5), (6) |
| III | (1), (2), (3), (7) | (4), (5), (6) |

We claim:

1. A radiation image read-out and reproducing method wherein a read-out operation is carried out in which a stimulable phosphor sheet having a radiation image stored thereon is exposed to stimulating rays, which cause the stimulable phosphor sheet to emit light in proportion to the amount of energy stored thereon during exposure to radiation, and wherein the emitted light is photoelectrically detected and a read-out image signal is thereby obtained, said read-out image signal representing the radiation image and being used in a reproducing operation in which the radiation image is reproduced as a visible image, the radiation image read-out and reproducing method comprising the steps of:

(i) carrying out processing which obtains information from said read-out image signal, said information being used to determine optimum image processing conditions under which at least one image processing is to be conducted, and carrying out at least one type of image processing which can be conducted without said information being used, said processing which obtains information and said at least one type of processing being carried out during the period of time from when said read-out operation is being carried out to when said reproducing operation is begun, and (ii) carrying out further image processing, wherein the optimum image processing conditions are determined on the basis of said information after said reproducing operation is begun.

2. A method as defined in claim 1 wherein said at least one other type of said image processing, which can be conducted without said information being used, is selected from the group consisting of RI removal processing, unsharp mask operation processing, and enlargement/reduction processing.

3. A method as defined in claim 1 wherein said image processing, for which the optimum image processing conditions are determined, is selected from the group consisting of transformation processing based on said information, frequency emphasis processing, and gradation processing.

4. A method as defined in claim 1, 2, or 3 wherein said information, which is used to determine the conditions under which image processing is to be conducted, includes a read-out gain and/or a scale factor.

* * * * *